358-69. OR 3,514,531 SR

16532 SEARCH ROOM

May 26, 1970 R. A. H. BROUSMICHE 3,514,531

COLOR DISPLAY CRT INDEXING SYSTEM

Filed Sept. 14, 1966 3 Sheets-Sheet 1

INVENTOR
Roger A.H. BROUSMICHE
BY

ATTORNEY

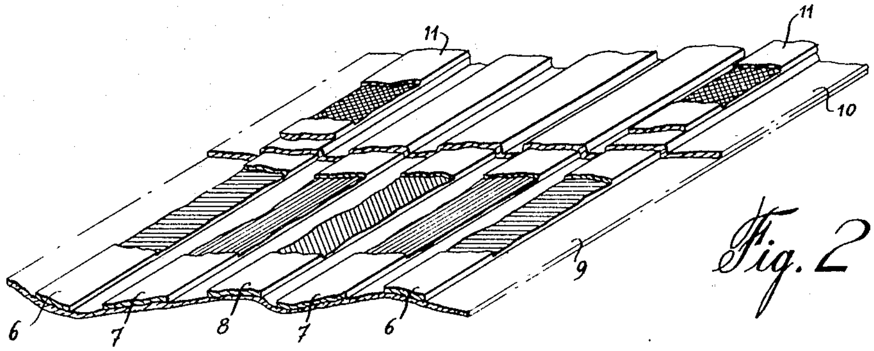
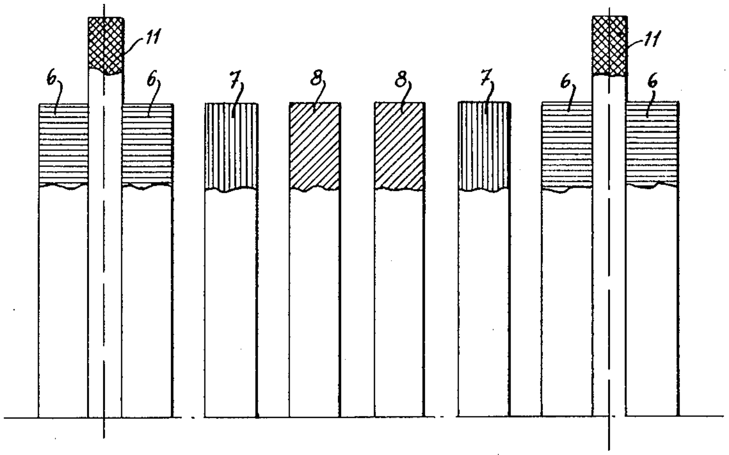
Fig. 8
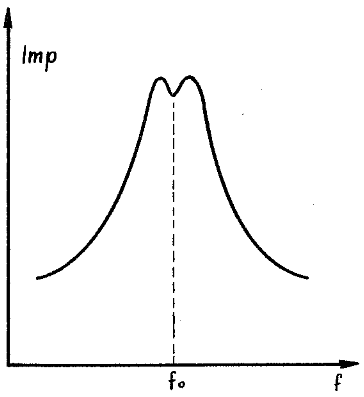
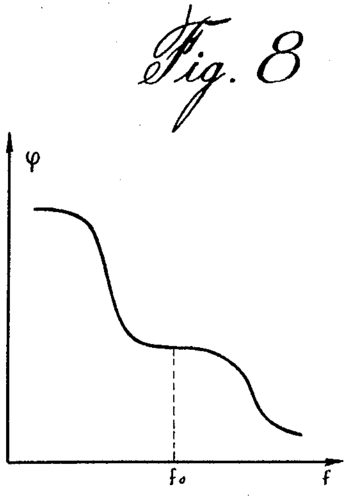
Fig. 6 Fig. 7
INVENTOR
Roger A.H. BROUSMICHE
BY
Raymond A. [signature]
ATTORNEY INVENTOR
Roger A.H. BROUSMICHE
BY
Raymond A. Robic
ATTORNEY

United States Patent Office 3,514,531
Patented May 26, 1970

3,514,531

COLOR DISPLAY CRT INDEXING SYSTEM

Roger A. H. Brousmiche, Solre-sur-Sambre, Belgium, assignor to Ateliers de Constructions Electriques de Charleroi (ACEC), Societe Anonyme, Charleroi, Belgium Filed Sept. 14, 1966, Ser. No. 579,413
Int. Cl. H04n 9/24
U.S. Cl. 178—5.4 3 Claims

ABSTRACT OF THE DISCLOSURE

The disclosure relates to a circuit for controlling the intensity of an electronic beam scanning the screen of a receiver tube for color televeision having index bands. This circuit is used with tubes having a screen formed of several identical groups of more than three vertical bands of luminescent materials of three fundamental colors and more particularly with tubes in which, in each group, the bands of one of the fundamental colors is located in each interval between two bands of the other two fundamental colors. This circuit permits to reproduce an image in color by a suitable decomposition of the conventional chrominance and luminance signals in modulating one of the components of the signals with an oscillation cos $\omega t$, a second one of the components of the signals with an oscillation cos $2\omega t$ while the third component is not modulated by a sinusoidal oscillation so that the control of the intensity of the beam is realized by a signal resulting from a simple superposition of these three components. The frequency $\omega$ is the frequency of interception of the index bands by the electronic beam.

The present invention relates to certain improvements in receivers for color television and more specifically to improvements in the circuit for the control of the intensity of the electronic beam of a color television receiver tube having index bands. Such a tube comprises a single electronic gun, that is a single cathode with grid for controlling the intensity of the beam and a screen made up of successive and identical groups of several vertical bands of three different types of luminescent materials having predetermined positions in relation to index bands that may also be of a luminescent material, radiating ultraviolet light. A device for the detection of the interception of the electronic ray beam by the index band is incorporated in the tube or arranged closed to it. Receiver tubes of this type for color television are known; generally their screen is made up of identical and successive groups of three vertical bands of three kinds of luminescent materials, the index bands coinciding for instance with the bands of blue luminescent material. A signal for the control of the intensity of the electronic beam, generated in a control circuit, is applied between the cathode and the grid of the tube. The receiver further comprises means to deviate the electronic ray beam and other devices and auxiliary circuits that do not form part of the invention.

In the transmission system presently recommended or used, known by the signal NTSC, SECAM or PAL, the video signal received comprises, on the one hand, a luminescence intelligence the signal of which is conventionally designated by Y'. The signal Y' is transmitted with a wide pass-band by means of a carrier; it controls the reproduction of a black and white image and allows to take into account very fine details because of the width of the band of the transmitted frequencies. The video signal further comprises chrominance intelligence the signals of which, conventionally designated $R'-Y'$ and $B'-Y'$ are transmitted with narrow pass-band by means of a sub-carrier. The chrominance signals $R'-Y'$ and $B'-Y'$ only reproduce outstanding details by reason of the narrowness of the band of the transmitted frequencies. Generally, the video signal received is resolved into three demodulators. The resolution may be carried out directly into components of the three fundamental colors or more advantageously, according to the transmission systems in use, into a brightness signal Y' on the one hand and into two chrominance signals on the other hand, the latter made up of components $R'-Y'$ and $B'-Y'$ in appropriate proportions. For this, two chrominance demodulators produce two output signals transmitted with a narrow pass-band in which the components of the fundamental colors are provided with coefficients such that their sum is zero and a luminance demodulator produces an output signal, transmitted with a wide pass-band, in which the components of the three fundamental colors are provided with coefficients such that the sum of these coefficients is equal to one. This luminance demodulator may be followed by an adder that superimposes on the luminous signals correction signals obtained at the output of the chrominance demodulators.

In certain known circuits for the control of the intensity of the electronic beam of a receiver tube for color television having index bands, a device for the detection of the interception of the beam by the index bands is connected to an oscillating device in which oscillations are generated, for instances cos $\omega t$ and cos $2\omega t$, $\omega$ being the frequency of interception of the electronic ray beam by the index bands. These oscillations can control gate circuits or can be modulated by the output signals of the chrominance and luminance demodulators.

All the above-mentioned elements are by themselves known in the case of the use of index band tubes comprising consecutive and identical groups of three bands of three fundamental colors: red, green, blue.

An object of the invention lies in the provision of a circuit for the control of the intensity of the electronic beam, applicable to a receiver tube for color television having index bands comprising consecutive and identical groups of more than three bands of three fundamental colors, the bands of one of the fundamental colors being arranged in each interval between two bands of the other two fundamental colors. Such a tube is known in itself and it is also known that the index signal generated in the said tube has no phase distortion, provided that the modulation signal be a symmetrical function in relation to the intervals of interception of the beam by the tracking bands.

The control of the beam of this known tube comprises three commutator or modulator devices in which the elementary components of the three fundamental colors R', V' and B' modulate the signals cos $\omega t$, —cos $\omega t$ and cos $2\omega t$. These elementary components must be formed in the receiver from the signals Y', $(R'-Y')$ and $(B'-Y')$, which results in complicated and costly circuits because the signal Y' is a signal transmitted through a pass-band that is relatively wide, whereas the signals $(R'-Y')$ and $(B'-Y')$ are signals that are transmitted through a relatively narrow pass-band. During the formation of the elementary components R′, V′, B′, the signal Y′ comes in at each time and thus requires wide pass-band circuits resulting in very difficult problems of intermodulation between the modulation lateral bands of the output signals of the modulators.

The invention makes it possible to considerably simplify the signal for the control of the intensity of the beam due to the fact that the chrominance signal modulating the components cos $\omega t$ and cos $2\omega t$ only comprise components of color difference, transmitted with a narrow pass-band, so that the circuits giving this modulation may also be narrow-band circuits. On the other hand, the luminance signal Y′ transmitted with a wide pass-band is applied on an electrode for the modulation of the intensity of the beam without any modulation expedient.

For this purpose, one of the chrominance signals does not include any component of the fundamental color the bands of which are arranged in each interval between the other two fundamental colors and comprises, in equal proportions but with reversed polarities, components of the other two fundamental colors. This signal, appearing at the output of one of the chrominance demodulators, modulates the transmitted cos $\omega t$ oscillation with an envelope delay that is constantly nil, $\omega$ being the frequency of interception of the beam by the index bands. The chrominance signal appearing at the output of the other chrominance demodulator modulates the transmitted cos $2\omega t$ oscillation with an envelope delay that is constantly nil; it comprises the components of the three fundamenal colors bearing coefficients the sum of which is nil, for instance +1, +1 and −2, the coefficient −2 affecting the component of the fundamental color the bands of which are located in the intervals between the bands of the other two colors. The two signals cos $\omega t$ and cos $2\omega t$ modulated as described above, as well as the output signal of the luminance demodulator or, eventually, the output signal of the adder following the luminance demodulator are superimposed one over the other and applied between the cathode and the grid for controlling the intensity of the beam of the receiver tube for color television having index bands. In the output signal of the luminance demodulator or of the adder that follows it, the coefficients determining the components of the fundamental colors are proportional to the total width of the bands of each fundamental color contained in each group and the sum of these coefficients is equal to one.

The luminance signal, transmitted with a wide passband is defined according to existing television systems by $$Y'=0.59V'+0.3R'+0.11B'$$

In this equation, the sum of the coefficients $$0.59+0.3+0.11=1$$

This property is retained when a signal $$Y'+a(R'-Y')+b(B'-Y')$$

is formed such at is appears at the output of the adder of the signals transmitted by the luminance and chrominance demodulators. Even if the image is not colored, that is when $R'-Y'=B'-Y'=O$, Y′ appears alone at the output of this adder, but Y′ comprises the most important information since this signal is transmitted with a wide pass-band. One of the advantages obtained with the invention resides in the fact that the wide-band signal must not be subjected to any modulation which would necessitate sensitive and costly circuits and that the color-difference signal must not be subjected to phase modulation thus avoiding the difficulties of phase flutter in the index signal.

The "envelope delay," sometimes also called "group delay," is commonly described by the slope of the curve that gives the variations of the phase of a signal as a function of the frequency of its carrier. For a zero envelope delay, the phase of the transmitted signal is thus practically constant for the frequencies close to a predeterminal frequency, under the circumstances the mean frequency of interception of the beam by the index bands. There already exists devices for selective transmission with zero envelope delay; they have a phase curve having a tangent parallel to the axis of the frequencies at the point of the predetermined frequency.

In order to avoid errors in phase during the modulation by the output signal of a chrominance demodulator, the oscillations cos $\omega t$ and cos $2\omega t$ are generated in devices for selective transmission the impedances of which are high at the frequencies close to the predetermined frequency, under the circumstances, the mean frequency with which the beam of eletcronic rays is intercepted by the index bands or respectively the double of this frequency and weak at the other frequencies. A particularly advantageous device for the selective transmission of electrical signals is made up of a number N (at least one) of resonant circuits, tuned to a predetermined frequency $fo$, in which the overshooting by an effective frequency $f$ of the predetermined frequency $fo$ causes an increase in the phase of the transmitted signal, (for instance a series resonant circuit located between the terminals where the signal appears) and by at least a number $(N+1)$ of resonant circuits tuned to the frequency $fo$ in which the overshooting by the effective frequency $f$ of the mean frequency $fm$ causes a decrease in the phase of the transmitted signal (for instance parallel resonant circuits located between the output terminals of the amplifier stages where the signal appears) and in that the elements of the aforesaid resonant circuits and those of the amplifiers, attenuators or modulators eventually added, are chosen in such a manner that for a small difference between the frequency $f$ and the predetermined frequency $fo$, the phase of the signal remains constant.

The number N or $N+1$ of independent resonant circuits cannot always be recognized with accuracy at first glance on the diagram. Thus, the fact of connecting a parallel resonant circuit and a series resonant circuit between the two terminals where the signal appears has the effect, by reason of the interference between the said two resonant circuits, of acting like an assembly made up of two parallel resonant circuits and one series resonant circuit, independent of one another. Similarly, the fact of placing a parallel resonant circuit in a negative feedback connection of an amplification stage of the signal and a parallel resonant circuit between the output terminals of this amplification stage has the effect, by reason of the interference of these two resonant circuits, to act as an assembly made up of two parallel resonant circuits and one series resonant circuit independently of one another.

To recognize the numbers N and $(N+1)$ of the independent resonant circuits and to easily choose the elements of the resonant circuits and those of the modulator-amplifiers or attenuators eventually added, it is sufficient to write out the equation of the gain of the assembly or the ratio between the output value and the input value in the following form:

$$G=K\frac{(1+j\delta p_1)(1+j\delta p_2)(\ldots)}{(1+j\delta q_1)(1+j\delta q_2)(1+j\delta q_3)(\ldots)}$$

G being the ratio between the output value and the input value, $j$ being the algebraic imaginary unit, $p_1$, $p_2$, $q_1$, $q_2$, $q_3$ being the quality factors of the resonant circuits independent from one another, $\delta$ being the relative variation of the frequency of the carrier $f$ in relation to the predetermined frequency $fo$, $$\delta=\frac{f}{fo}-\frac{fo}{f}$$

and K being a factor independent of $j$.

In order to obtain a zero envelope delay, that is a constant phase $\varphi$ for the neighborhood of the frequency *fo*, it is necessary that $$\frac{d\varphi}{d\delta}=o$$

if $\varphi$ is called the initial phase of the signal, one has $$\varphi=\varphi_0+\text{arc tan } \delta p_1+\text{arc tan } \delta p_2+\ldots$$
$$-\text{arc tan } \delta q_1-\text{arc tan } \delta q_2-\text{arc tan } \delta q_3-\ldots$$

so that in order that $\delta=0$, $$\frac{d\varphi}{d\delta}=p_1+p_2+\ldots-q_1-q_2-q_3=0$$

This latter condition makes it possible to choose the elements of the resonant circuits and those of the amplifiers, attenuators or modulators eventually added in relation to one another in order to obtain the desired result.

One embodiment of the invention is described hereinafter in reference to the drawing wherein:

FIG. 2 is a detailed perspective view of a television screen, partially in cross-section;

FIG. 6 shows a curve of the impedance of the circuit of FIG. 5 in relation to frequency *f*;

FIG. 7 shows a curve of the signal phase $\varphi$ of the circuit of FIG. 5 in relation to frequency *f*;

FIG. 8 is a diagrammatic view of one embodiment of the invention where bands of luminescent materials of equal luminescence quality are used.

Figure 1:
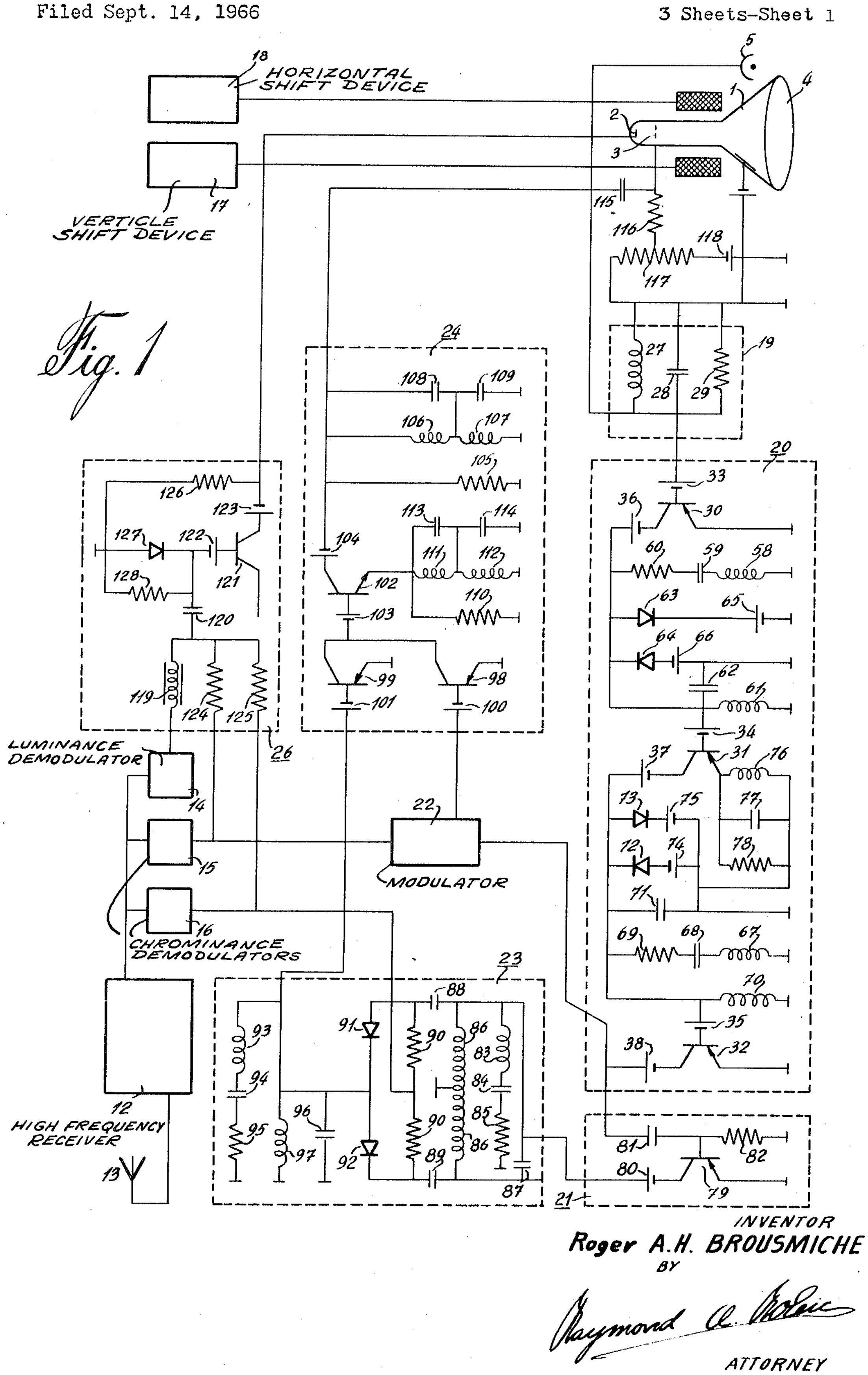
FIG. 1 is an electrical diagram of the device of the invention.

In FIG. 1, a receiver tube 1 for color television comprises on the one hand an electronic gun having a cathode 2 and a control grid 3 for controlling the intensity of the electronic ray beam. Tube 1 comprises on the other hand a screen 4 formed of vertical bands of luminescent material and index bands as well as a device 5 for the detection of the interception of the electronic ray beam by the index bands. FIG. 2 illustrates in detail a view of a screen 4, partially in cross-section, having a distribution of red, green, blue bands of luminescent material and tracking bands. Blue bands 6, red bands 7 and green bands 8 of luminescent material are arranged on the glass 9 of screen 4 of the tube 1. Bands 6, 7 and 8 are coated with a transparent layer 10 over which index bands 11 are applied, coinciding with the blue band 6 of luminescent material. The index bands 11 are made for instance of luminescent material radiating ultraviolet rays.

Also shown in FIG. 1, there is a circuit for the control of the instantaneous intensity of the electronic ray beam that makes it possible to control the voltage between the cathode 2 and the grid 3. This circuit comprises a high frequency receiver 12 connected to a receiving antenna 13, a luminance demodulator 14, two chrominance demodulators 15 and 16, a vertical shift device 17, a horizontal shift device 18, a filter 19, an amplifier and amplitude limiter 20, a frequency doubler 21, two balanced modulators 22 and 23, an amplifier-adder 24 and an amplifier-adder 26 for the luminance signal.

The signal picked up by antenna 13 and received in the high frequency receiver 12 is directed, on the one hand, toward the luminance modulator 14 at the output of which appears the signal Y' embodying the luminance of a black and white television signal, and is directed on the other hand toward the two chrominance demodulators 15 and 16 at the output of which respectively appear the signal $$[0.25(R'-Y')+0.59(B'-Y')]$$

and $$[-0.63(R'-Y')+0.2(B'-Y')]$$

R' and B' being the components of the red and blue fundamental colors, respectively. The signal for the control of the instantaneous intensity of the electronic ray beam is formed in the amplifiers-adders 24 and 25 by means of the output signals of devices 14, 15 and 16. The beam successively sweeps the bands 6, 7 and 8 of luminescent materials and, simultaneously as well, the index bands 11.

The interception of the beam of electronic rays by the index bands is detected by device 5 comprising, for instance, a photoelectric cell, sensitive to the ultraviolet light radiated by the index bands when scanned by the electronic ray beam. Since the index bands 11 are uniformly distributed over screen 4, a current of variable amplitude is generated in the detector 5. This current flows through filter 19 formed of a coil 27, a condenser 28 and a resistance 29. The output voltage of filter 19 is a sinusoidal oscillation of frequency *f* equal to the frequency of interception of the beam by the index bands, representing the fundamental component of the current generated in the detector 5. This output voltage has an amplitude which is highly variable if the interception frequency *f* of the beam by the index bands does not correspond exactly to the natural frequency *fo* of filter 19 because the current of detector 5 and the output voltage of filter 19 are out of phase in relation to one another. These amplitude variations resulting from this phase difference are corrected in the amplitude-limiter amplifier 20 connected to filter 19. This amplifier 20 comprises three transistors 30, 31, 32 connected in cascade. The bases of these transistors are polarized by three voltage sources 33, 34, 35 and their collectors are fed by three other voltage sources 36, 37, 38. The sinusoidal oscillation at the input of device 20 is amplified by the transistor 30 and limited in amplitude by a selective transmission device, holding the signal phase constant for the frequencies close to the natural frequency of filter 19.

Figure 3:
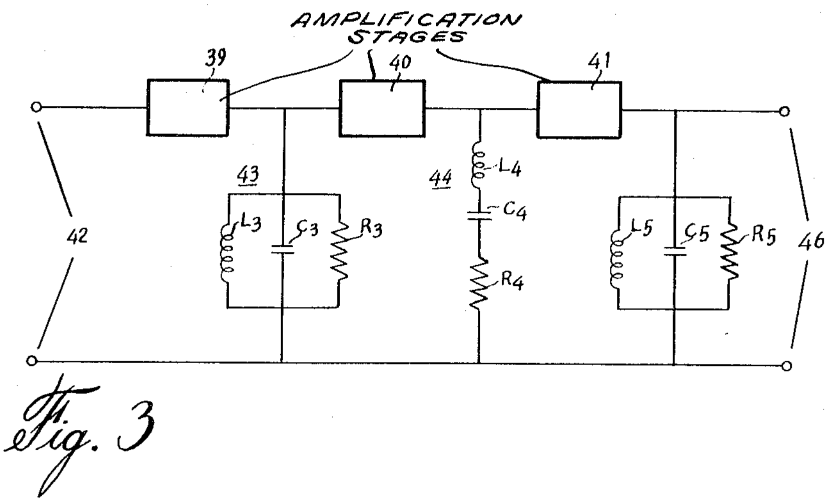
FIGS. 3, 4 and 5 are electrical diagrams of component parts of the device of the invention.

A device for selective transmission, made up as defined above, is particularly simple as shown in the following descriptions:

The detail diagram of FIG. 3 illustrates a selective amplification circuit having three stages 39, 40, 41. The signal to be transmitted is applied at the input 42 of the first stage 39. A parallel resonant circuit 43 is arranged at the output terminals of stage 39 or what is the same at the input terminals of 40, circuit 43 being made up by elements $L_3$, $C_3$, $R_3$ tuned to a predetermined frequency *fo*. In this case, the frequency *fo* is the very frequency of filter 19. A series resonant circuit 44 is located at the output terminals of stage 40 or what is the same at the input terminal of stage 41, circuit 44 being made up of elements $L_4$, $C_4$, $R_4$ tuned on the same frequency *fo* and at the output terminals 44 of stage 41 is provided a second parallel resonant circuit 45 formed by the elements $L_5$, $C_5$, $R_5$ tuned on the same frequency *fo*. If one designates by $$Q_4=\frac{1}{\omega_0 C_4 R_4}\,(\omega_0=2\pi f_0)$$

the quality factor of circuit 44, and by $Q_3=\omega_0 C_3 R_3$ and $Q_5=\omega_0 C_5 R_5$, respectively, the quality factors of the parallel resonant circuits 43 and 45, the ratio between the output voltage of the amplifier 41 across terminal 46 and the input voltage of amplifier 39 across terminals 42 is equal to :

$$G=K\frac{1+j\delta Q_4}{(1+j\delta Q_3)(1+j\delta Q_5)}$$

*j* being the algebraic imaginary unit, $\delta$ being the relative variation of the effective frequency *f* in relation to the predetermined frequency *fo*

$$\delta=\frac{f}{fo}-\frac{fo}{f}$$

and K being the gain of the assembly at the frequency *fo*.

In this case, the phase $\varphi$ of the signal going across the amplification circuit according to FIG. 3 is equal to $$+\arc\tan\delta Q_4-\arc\tan\delta Q_3-\arc\tan\delta Q_5$$

To reach a zero envelope delay, it is necessary that for $\delta=0$ the value $$\frac{d\varphi}{d\delta}$$

be nil. This happens if $Q_4=Q_3+Q_5$ that is if the quality factor of the series resonant circuit 44 is equal to the sum of the quality factors of the parallel resonant circuits 43 and 45.

Figure 4:
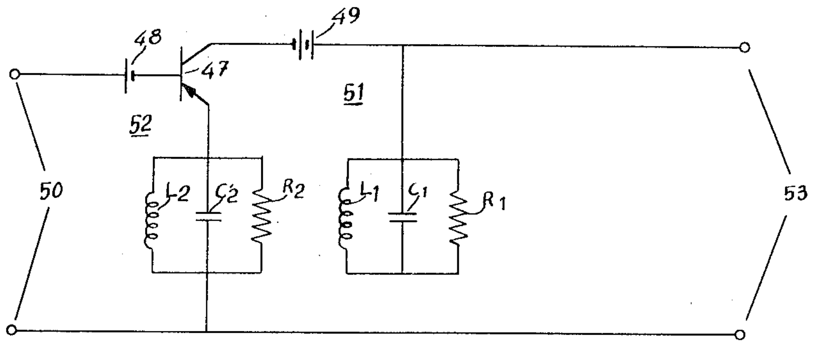

The detailed diagram of FIG. 4 illustrates a transistor amplifier 47 polarized by two voltage sources 48 and 49. Amplifier 47 amplifies the signal applied across its input terminals 50. A parallel resonant circuit 51 formed by elements $L_1$, $C_1$, $R_1$ is located between the output terminals 53 where the amplified signal appears. This parallel resonant circuit 51 has a quality factor $$Q_1=\omega_0 C_1 R_1$$

it is tuned to a predetermined frequency $$\omega_0=2\pi fo$$

A second parallel resonant circuit 52, made of elements $L_2$, $C_2$, $R_2$, tuned to the same frequency *fo* is inserted in a negative feedback connection of the emitter current of transistor 47. The quality factor of this resonant circuit 52 is $$Q_2=\omega_0 C_2 R_2$$

If S stands for the value of the slope of the variation of the collector current of transistor 47 as a function of the voltage applied between the base and the emitter, the gain of this circuit is equal to:

$$G=\frac{SR_1}{1+SR_2}\frac{1+j\delta Q_2}{(1+j\delta Q_1)\left(1+j\delta\frac{Q_2}{1+SR_2}\right)}$$

In this equation, the product $SR_2$ is equal to the negative feedback factor at the frequency *fo*. In order to obtain a transmission device with a zero envelope delay, when $\delta=0$ it is necessary that $$Q_2=Q_1+\frac{Q_2}{1+SR_2}$$

that is $$SR_2=\frac{Q_1}{Q_2-Q_1}$$

It is thus posible to choose the elements of the resonant circuits 51 and 52 and of the amplifier 47 in relation to one another to satisfy the condition that the envelope delay be nil at the frequency *fo*.

Figure 5:
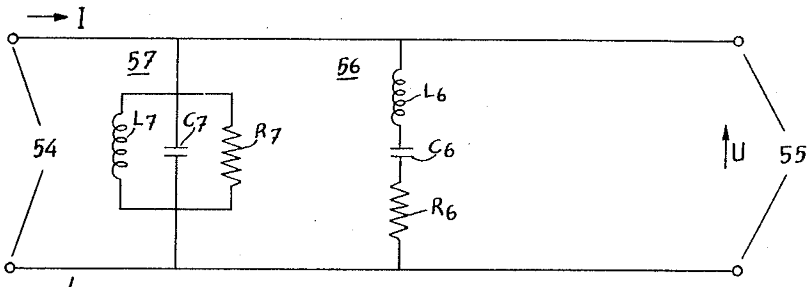

The diagram of FIG. 5 illustrates a filter circuit having input terminals 54 and output terminals 55. This circuit comprises a series resonant circuit 56 and a parallel resonant circuit 57 both tuned to the frequency *fo*. If $L_6$, $C_6$, $R_6$ stand for the elements of the resonant circuit 56 and $L_7$, $C_7$, $R_7$ for the elements of the resonant circuit 57, the ratio between output voltage and the input current of this circuit is equal to $$\frac{U}{I}=\frac{Z_6Z_7}{Z_6+Z_7}$$

$Z_6$ and $Z_7$ being the impedances of the circuits 56 and 57 respectively.

If $Q_6$ and $Q_7$ respectively stand for the quality factors of the resonant circuits 56 and 57, then $$Z_6=R_6(1+j\delta Q_6)$$

and $$Z_7=R_7\frac{1}{1+j\delta Q_7}$$

Consequently:

$$\frac{U}{I}=\frac{R_6R_7}{R_6+R_7}\frac{1+j\delta Q_6}{1+j\delta\frac{R_6(Q_6+Q_7)}{R_6+R_7}+(j\delta)^2\frac{Q_6Q_7R_6}{R_6+R_7}}$$

when $$r^2=\frac{R_6^2(Q_6+Q_7)^2}{4(R_6+R_7)^2}-\frac{Q_6Q_7R_6}{(R_6+R_7)}$$

$$\frac{U}{I}=\frac{R_6R_7}{R_6+R_7}\frac{1+j\delta Q_6}{\left[1+j\delta\left(\frac{R_6(Q_6+Q_7)}{2(R_6+R_7)}+r\right)\right]\left[1+j\delta\left(\frac{R_6(Q_6+Q_7)}{2(R_6+R_7)}-r\right)\right]}$$

The expression *U/I* thus takes the same form as that obtained for the gain of the amplifiers according to FIGS. 3 and 4 and the condition that is necessary to obtain a zero envelope delay becomes $$\frac{Q_6}{R_6}=\frac{Q_7}{R_7}$$

In order to find the condition that must be satisfied by the elements of the resonant circuits constituting the device for the transmission of electrical signals having zero envelope delay for a predetermined frequency *fo*, it is thus sufficient to find the gain or the ratio between the input value and the output value of the device and to write it in the general formula $$\frac{(1+j\delta p_1)(1+j\delta p_2)(\ldots)\ldots}{(1+j\delta q_1)(1+j\delta q_2)(1+j\delta q_3)(\ldots)\ldots}$$

The fact that the above formula contains a greater number of independent resonant circuits in which the overshoot of the predetermined frequency by the effective frequency causes a decrease of the phase of the transmitted signal is an expression of the quality of the device to be selective.

The necessary condition to obtain a zero delay envelope about the value $\delta=0$ is then:

$$p_1+p_2+\ldots-q_1-q_2-q_3=0$$

There is generally a great number of solutions that satisfy this condition.

Coming back to FIG. 1, the device 20 comprises a first amplitude limiter mounted between collector and emitter of transistor 30, constituting a selective transmission device, holding the phase of the transmitted signal constant for the frequencies close to the natural frequency *fo* of filter 19. This transmission device comprises on the one hand a series resonant circuit, made up by coil 58, condenser 59 and resistance 60, and on the other hand by a parallel resonant circuit formed by a coil 61, a condenser 62 and a resistance that is variable in relation to the voltage across its terminals. This variable resistance has the effect of limiting the amplitude of the signal applied thereto; it is formed by two rectifiers 63 and 64 associated with two appropriate polarization sources 65 and 66. Because the relation $$\frac{Q_6}{R_6}=\frac{Q_7}{R_7}$$

deduced from FIG. 5 can also be written $$\frac{Q_6}{R_6}=\omega_0 C_7$$

there follows that it is independent of the value of the resistance $R_7$ of the parallel resonant circuit. That this resistance be variable does not therefore present any inconvenients. Despite this, the transmission device holds the phase of the transmitted signal constant. The amplitude limiter thus effectively holds the phase of the transmitted signal constant when the latter has a frequency which is close to the natural frequence *fo* of the filter 19 to which the elements 58 and 59 on the one hand and 61 and 62 on the other hand of the resonant circuits are tuned.

In this case, the impedance of the circuit in relation to the frequency is as illustrated in FIG. 6, whereas the phase of the signal in relation to the frequency varies as shown by the curve of FIG. 7. The output signal of this stage, appearing at the common terminal of diodes 63 and 64 has an amplitude which is nearly independent of the variations of the collector current of transistor 30 and has a phase equal to that of the input signal. The second stage of the amplifier-limiter 20, comprising transistor 31, is constructed in the same manner with respect to the series resonant circuit formed by the coil 67, the condenser 68 and the resistance 69 and the parallel resonant circuit formed by the coil 70, the condenser 71, the diodes 72 and 73 and the sources of polarization 74 and 75. It distinguishes from the first stage in that a parallel resonant circuit always tuned on the natural frequency $f_0$ of filter 19 and formed by the coil 76, the condenser 77 and the resistance 78 is inserted in a negative feedback connection in the emitter circuit of transistor 31. Similarly to the circuit shown in FIG. 4, the elements of this parallel resonant circuit are selected in relation to the elements of the parallel resonant circuit of filter 19 in such a manner that the dephasing introduced by filter 19 be compensated. There follows that the output voltage of the second stage of device 20 appearing at the common terminal of diodes 72 and 73 is independent of the amplitude variations of the photo-electric current of cell 5 and is in phase therewith. This voltage produces the output signal of device 20 after a last amplification in the transistor 32. The output signal of device 20 is a sinusoidal oscillation cos $\omega t$ of frequency $\omega=2\pi f$ identical to that of the fundamental harmonic of the photo-electric current of cell 5 and constantly in phase with this fundamental harmonic.

The output signal of device 20, appearing at the collector of transistor 32, is applied to two other circuits: to the balanced modulator 22 and to the frequency doubler 21. In the balanced modulator 22, the oscillation cos $\omega t$ is modulated by the output signal of the chrominance demodulator 15, so that at the output of the balanced modulator 22 there appears the signal $$[0.25(R'-Y')+0.59(B'-Y')] \cos \omega t$$

The internal construction of modulator 22 is, in principle, identical to that of the modulator 23, the diagram of which is explained hereunder.

The modulator 23 allows the modulation of an oscillation having a double frequency cos $2\omega t$ with the output signal of the chrominance demodulator 16. For this purpose, the output signal of the amplifier-limiter 20 goes through the frequency doubler 21. The latter is for instance made up of a transistor 79, operating in class C, fed by a voltage source 80. The output signal of device 20 is applied, through a condenser 81, across the terminals of a resistance 82 connected to the base of the transistor 79.

The balanced modulator 23 comprises a constant phase band filter for the oscillation applied to its input: cos $2\omega t$, made up of a series resonant circuit having a coil 83, a condenser 84 and a resistance 85, and of a parallel resonant circuit having a coil 86 the central point of which is grounded and a condenser 87. There are, at the two ends of coil 86, voltages of reversed polarities and equal amplitudes the frequency of which is twice that of the oscillation at the output of device 20. They are applied across two condensers 88 and 89, to resistance 90 the central point of which is connected to the output of the chrominance demodulator 16 and to two diodes 91 and 92 mounted in series. The common terminal of diodes 91 and 92 is connected to the constant phase band filter formed by a series resonant circuit having a coil 93, a condenser 94 and a resistance 95 and by a parallel resonant circuit having a condenser 96 and a coil 97. There thus appears at the output of the balance demodulator 23, a sinusoidal oscillation having a frequency $2\omega$, modulated in amplitude by the component of the video signal appearing at the output of the demodulator 16:

$$[-0.63(R'-Y')+0.20(B'-Y')] \cos 2\omega t$$

The output signals of the balanced modulators 22 and 23 are simultaneously applied at the input of the amplifier-adder 24. The latter comprises two transistors 98 and 99 polarized by two voltage sources 100 and 101. The collector currents of transistors 98 and 99 are jointly applied on the base of transistor 102 fed by two voltage sources 103 and 104. There appears at the collector of transistor 102, the sum of the filtered input signals across the terminals of a selective filter formed of a resistance 105, two coils 106 and 107 and two condensers 108 and 109. In order to obtain a constant-phase or zero envelope-delay transmission device, a similar resonant circuit comprising a resistance 110, two coils 111 and 112 and two condensers 113 and 114 are arranged in a negative feedback connection of transistor 102.

The sum of the signals:

$$[0.25(R'-Y')+0.59(B'-Y')] \cos \omega t + [-0.63(R'-Y')+0.2(B'-Y')] \cos 2\omega t$$

appearing at the output of the amplifier-adder 24, is applied across a condenser 115 at the grid 3 of the color television receiver tube 1. The mean potential of grid 3 is fixed by a connection through a resistance 116 to a polarization voltage appearing across the movable terminal of a potentiometer 117 connected to a voltage source 118.

The output signal of the luminance demodulator 14 is applied at the input of the amplifier adder 26. This output signal is directed across a retarding line 119 and a condenser 120 to the base of a transistor 121 polarized by two voltage sources 122 and 123. In order to allow the introduction of corrective terms as functions of the chrominance signals, the output signal of the chrominance demodulator 15 is applied to the condenser 120 through a resistance 124 and the output signal of the chrominance demodulator 16 is applied to the condenser 120 through a resistance 125. The delay line 119 is intended to compensate the delay introduced by the demodulators 15 and 16 in their output signals. The resistances 124 and 125 are to be dimensioned in such a manner that the sum of the signals at the base of transistor 121 be proportional to $$Y'+0.37(R'-Y')+0.2(B'-Y')$$

this sum of signals is amplified by the transistor 121 the collector output signal of which appearing across the terminals of a resistance 126 is applied to the cathode 2 of the television receiver tube 1.

The continuous component of the luminance signal is given by the assembly made up of the diode 127 and the resistance 128.

Hereinabove, the signals delivered by the demodulators 14, 15 and 16 have been characterized by the values Y', $(R'-Y')$ and $B'-Y')$. This distinction in Y' and $(R'-Y')$, $(B'-Y')$ takes into account the pass-bands attributed to the different signals. When this property, essential in itself, is disregarded, it is possible to define the various signals more simply by referring to te components of the fundamental colors R', V' and B'. The signal delivered by the adder device 26 is also equal to ¼ $(2R'+V'+B')$, the output signal of the demodultor 15 is equal to ½ $(B'-V')$ and the output signal of the demodulator 16 is equal to ¼$(-2R+B'+V')$. In these formulas, it is important to note that the coefficients of the terms for the various components in the luminance signal are proportional to the total width of the bands in each group, that the sum of the coefficients of the first term $0.5+0.25+0.25=1$, that the second term does not comprise any component of R', corresponding to that exciting the red bands that are always positioned between the bands of the other two blue and green fundamental colors and that the sum of the coefficients of the fundamental colors in the output signals of the demodulators 15 and 16 is zero. $(0.5-0.5=0$ and $-0.5+0.25+0.25=0)$.

Such a distribution of the components of the fundamental colors may be obtained in all of the cases independently of the fact that the parameters of the NTSC, SECAM or PAL systems are used. It is for this reason that the resolution of the components of the fundamental colors facilitate the understanding of the invention.

In the above example, it is assumed that the bands of luminescent materials are to be of equal width and that the intensity of the resulting colors is to be half for the red color than for the green and blue colors so that from the point of view of resulting luminescence the term that is not modulated in cos $\omega t$ or in cos $2\omega t$ represents an equal distribution of the three fundamental colors. In the present state of the art, the red luminescent materials used have precisely the disadvantage that their efficiency is smaller than that of the materials used for the other colors. The device according to the described example makes it possible to very easily counteract this fault.

However, the invention is also applicable when luminescent materials of equal luminescence quality are available. In such a case, it is for instance possible to provide groups of six bands of equal width of luminescent materials as illustrated for instance in FIG. 8 by the conventional hatching. For instance, these bands are arranged in the order of one blue band 6, one red band 7, two green bands 8, one red band 7, two blue bands 6, one red band, etc. The index bands 11 are for instance disposed in the interval between the contiguous blue band. In such a case, the output signal of the adder-amplifier 26 and the output signals of the domodulators 15 and 16 become, respectively:

$$1/\sqrt{3}(R'+V'+R')$$
$$1/\sqrt{3}(-V'+B')$$
$$1/\sqrt{3}(-2R'+V'+B')$$

The output signal of the luminance adder-amplifier comprises here equal quantities of the components of the fundamental colors whereas in the preceding example, the quantity of the red component was double in relation to the blue or green component. The ratios between the coefficients affecting the components of the fundamental colors in the luminance signal are thus equal to the ratio of the total width of the bands of each fundamental color in a group of bands defined by the centers of the index bands. Besides, if in a structure having six bands, the contiguous bands of the same color are joined in a single band, the six band structure is reduced to a four band structure in which the red bands have a smaller width.

I claim:

1. Circuit for controlling the intensity of an electronic beam scanning the screen of a receiver tube for color television having index bands, said screen being formed of several identical groups of more than three vertical bands of luminescent materials of three fundamental colors wherein the bands of one of the fundamental colors is located in each interval between two bands of the other two fundamental colors comprising:

(a) three demodulators for receiving a video signal, said demodulators including two chrominance demodulators producing output signals transmitted with a narrow passband in which components of the fundamental colors are provided with coefficients such that the sum thereof is zero, and a luminance demodulator producing an output signal transmitted with a wide pass-band in which the components of the three fundamental colors are provided with coefficients such that the sum of said coefficient is equal to one;

(b) a device for detecting the interception of the beam by the index bands;

(c) first means responsive to said detecting device for generating cos $\omega t$ oscillations and for transmitting said cos $\omega t$ oscillations with a constantly nil envelope delay;

(d) a first modulator to which is applied a first input signal consisting of said cos $\omega t$ oscillations and a second input signal originating from the output of one of the two chrominance demodulators, the output of said one chrominance demodulator being devoid of any components of the fundamental color the bands of which are disposed in each interval between two bands of the other two fundamental colors, but comprising equal proportions of the components of the other two fundamental colors but of opposed polarities;

(e) second means responsive to said first generating means for generating cos $2\omega t$ oscillations;

(f) a second modulator to which is applied a first input signal consisting of said cos $2\omega t$ oscillations and a second input signal originating from the output of the second chrominance demodulator, the output of said second chrominance demodulator comprising components of the three fundamental colors in the proportions $+1:+1:-2$, the coefficient $-2$ affecting the component of the fundamental color the bands of which are disposed in each interval between the bands of the other two fundamental colors; and (g) at least one adder amplifier allowing the superposition of all the signals coming out of the chrominance demodulators and the output signal of the luminance demodulator for applying such signals between the cathode and the grid of the color television tube.

2. A circuit according to claim 1, characterized in that in the output signal of the luminance demodulator, the coefficients affecting each component of the fundamental colors are proportional to the total width of the bands of the component of fundamental color in each group.

3. A circuit according to claim 1, wherein said first generating means includes a device for the selective transmission of electrical signals as a function of an effective frequency with a zero envelope delay at a predetermined frequency comprised in the pass-band of the frequencies, the said device being constituted by a number N at least equal to one, of independent resonant circuits tuned to said predetermined frequency, in which the overshoot of the predetermined frequency by the said effective frequency causes an increase in the phase of the transmitted signal and by at least a number N+1 of independent resonant circuits tuned to the same predetermined frequency, in which the overshoot of the predetermined frequency by the effective frequency causes a decrease in the phase of the transmitted signal.

References Cited

UNITED STATES PATENTS 3,271,610 9/1966 Law ---------------- 313—92
3,280,358 10/1966 Thompson ----------- 313—92

ROBERT L. GRIFFIN, Primary Examiner

R. L. RICHARDSON, Assistant Examiner